United States Patent Office 3,558,619
Patented Jan. 26, 1971

3,558,619
PRODUCTION OF N-FORMYLMORPHOLINE OR N-ACETYLMORPHOLINE
Herwig Hoffmann, Frankenthal, Pfalz, Ernst Fuerst, Neustadt, and Herbert Toussaint, Frankenthal, Pfalz, Germany, assignors to Badische Anilin- & Soda-Fabrik Aktiengesellschaft, Ludwigshafen (Rhine), Germany
No Drawing. Filed Aug. 27, 1968, Ser. No. 755,749
Claims priority, application Germany, Aug. 31, 1967, 1,670,266
Int. Cl. C07d 87/34
U.S. Cl. 260—247.7          7 Claims

ABSTRACT OF THE DISCLOSURE

Production of N-formylmorpholine or N-acetylmorpholine which comprises mixing morpholine with formic acid or acetic acid and distilling off the water formed from the reaction mixture in a column, a zone having a temperature of from 130° to 150° C. being maintained in the column above the point of supply and a zone having a temperature of from 210° to 230° C. being maintained below the point of supply. N-formylmorpholine and N-acetylmorpholine are suitable as extractants for aromatic hydrocarbons from hydrocarbon mixtures.

---

This invention relates to a process for the production of N-formylmorpholine or N-acetylmorpholine by reacting morpholine with formic acid or acetic acid.

It is known from U.S. patent specification No. 2,472,633 that N-acetylmorpholine can be obtained by reacting morpholine with isopropenyl acetate. The method has the disadvantages that it is expensive to use isopropenyl acetate and that long reaction periods are necessary.

It is an object of this invention to provide a process in which formic acid or acetic acid is used as the starting material. Another object of the invention is to provide a process in which only short reaction periods are necessary. Finally it is an object of this invention to provide a process which can easily be carried out continuously.

In accordance with this invention, these and other objects and advantages are achieved in a process for the production of N-formylmorpholine or N-acetylmorpholine which comprises mixing morpholine with formic acid or acetic acid and distilling off the water formed the reaction mixture in a column, a zone having a temperature of from 130° to 150° C. being maintained above the point of supply and a zone having a temperature of from 210° to 230° C. being maintained below the point of supply.

The new process has the advantage that formic acid or acetic acid can be used as starting material. Moreover it has the advantage that it can be carried out continuously with short residence times.

Morpholine and formic acid (or acetic acid) are advantageously mixed in molar ratio. Slight deviations from the molar ratio, for example of up to 10 mole percent, are possible. It is advantageous to maintain a temperature of from 50° to 100° C., particularly from 70° to 90° C., during mixing of the morpholine with the formic or acetic acid.

The water formed is distilled off from the reaction mixture in a column. Suitable columns advantageously have at least 50 and particularly more than 60 theoretical trays. It is an essential feature of the invention that above the point at which the reaction mixture is supplied to the column a zone is maintained which has a temperature of from 130° to 150° C., particularly from 135° to 145° C. It is advantageous for this zone to embrace 20 to 40 theoretical trays. Below the supply of the reaction mixture a zone is maintained at a temperature of from 210° to 230° C., particularly from 215° to 225° C. This second zone advantageously embraces 30 to 50 theoretical trays.

The process according to this invention may be carried out for example by mixing morpholine with acetic acid or formic acid in the specified ratios and at the specified temperatures and then passing the reaction mixture into a column having the specific number of theoretical trays, zones having the said temperatures being provided above and below the point of supply. Neutral water distills off at the top of the column, while pure N-formylmorpholine or pure N-acetylmorpholine is obtained as the bottoms from the column.

N-formylmorpholine and N-acetylmorpholine prepared by the process according to this invention are suitable as extractants for aromatic hydrocarbons (cf. Kirk-Othmer, Encyclopedia of Chemical Technology, 13,667 (1967)).

The invention is illustrated by the following examples in which parts mentioned are parts by weight.

EXAMPLE 1

Formic acid and morpholine are mixed in the molar ratio in a mixing vessel at 70° C. 150 parts per hour of this mixture is metered in at the upper third of a packed column having 100 theoretical trays. Above the point of supply a zone of about 30 theoretical trays is maintained at a temperature of 140° to 145° C. and below the point of supply a zone of about 40 theoretical trays is maintained at a temperature of from 220° to 230° C. Water distills off at the top of the column, while N-formylmorpholine, which has a melting point of 23° C., is drawn off from the bottom of the column. The N-formylmorpholine is distilled again to purify it. The yield is 95% of the theory.

EXAMPLE 2

The procedure of Example 1 is followed but acetic acid is used instead of formic acid. N-acetylmorpholine is obtained in a yield of 92% of the theory. It has a boiling point of 208° C. and a melting point of 14° C.

We claim:

1. A process for the production of N-formylmorpholine or N-acetylmorpholine which comprises mixing morpholine with formic or acetic acid at a temperature of from 50° to 100° C. and distilling off the water formed from the reaction mixture in a column in which a zone having a temperature of from 130° to 150° C is maintained above the point of supply of the reaction mixture and a zone having a temperature of from 210° to 230° C. is maintained below the point of supply of the reaction mixture.

2. A process as claimed in claim 1 in which formic or acetic acid and morpholine are used in a molar ratio.

3. A process as claimed in claim 1 in which formic or acetic acid and morpholine are mixed at a temperature of from 70° to 90° C.

4. A process as claimed in claim 1 wherein the zone above the point of supply comprises 20 to 40 theoretical trays.

5. A process as claimed in claim 1 in which the zone below the point of supply comprises 30 to 50 theoretical trays.

6. A process as claimed in claim 1 in which the zone in the column above the point of supply has a temperature of from 135° to 145° C.

7. A process as claimed in claim 1 in which the zone in the column below the point of supply has a temperature of from 215° to 225° C.

No references cited.

ALEX MAZEL, Primary Examiner

J. TOVAR, Assistant Examiner